July 1, 1924.
J. A. GORDON
AIR CLEANER
Filed Dec. 30, 1922
1,499,864
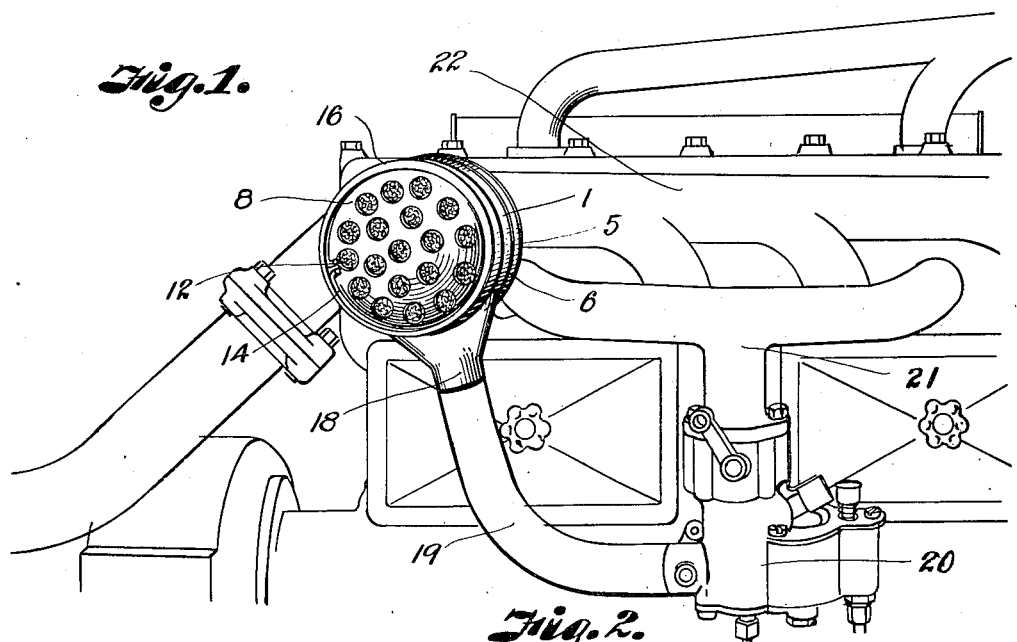
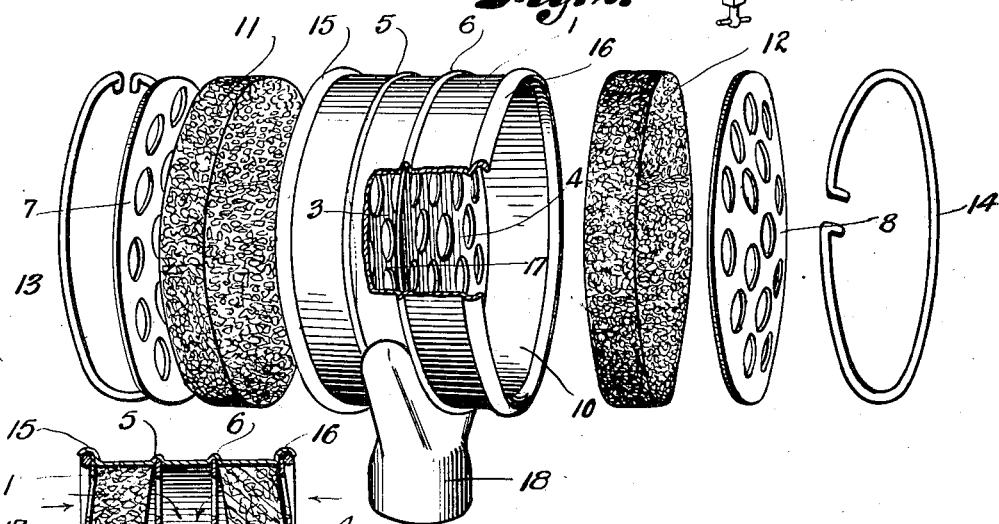
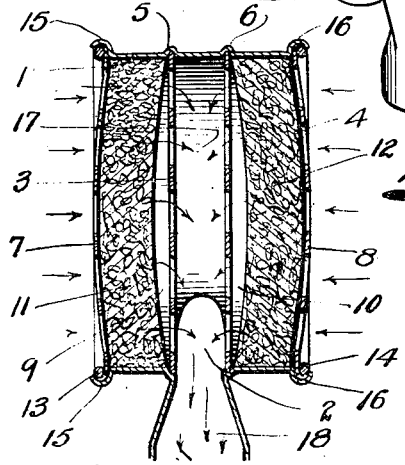
INVENTOR
John A. Gordon
BY
ATTORNEY Patented July 1, 1924.

1,499,864

UNITED STATES PATENT OFFICE.

JOHN A. GORDON, OF KANSAS CITY, MISSOURI.

AIR CLEANER.

Application filed December 30, 1922. Serial No. 610,072.

*To all whom it may concern:*

Be it known that I, JOHN A. GORDON, a citizen of the United States, residing at Kansas City, in the county of Jackson and State of Missouri, have invented certain new and useful Improvements in Air Cleaners; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an air cleaner and the primary object of the invention is to provide a device which will filter out dust, dirt and other extraneous matter from air preparatory to its passage to the fuel intake of an internal combustion motor.

The invention is applicable for use as an air filter or cleaner for any type of internal combustion motor but it is particularly designed for use in connection with motor vehicles, for example, trucks and tractors.

As will be appreciated, trucks and tractors operate under conditions which make the presence of dirt and small particles of dust continually present in the surrounding atmosphere and if this dust is drawn into the intake manifold of the engine and finds its way into the cylinders, it soon cuts out the valve seats, ruins the piston rings, causes scoring of the cylinders and has many other detrimental effects upon the general performance of the motor.

Air cleaners for the purpose of filtering out the objectionable matter from the air preparatory to feeding it to the combustion motor have been provided prior to my invention but my invention contemplates the provision of an air cleaner which can be confined within a relatively small space and yet filter out a maximum quantity of dust from the maximum quantity of air to be passed into the motor.

The novel features of the invention will be clearly apparent by reference to the following description in connection with the accompanying drawings, in which—

Fig. 1 is a perspective view of a portion of a motor vehicle engine to which my invention is applied.

Fig. 2 is a disassociated, perspective view of the various parts of the form of air cleaner selected for illustrative purposes, and Fig. 3 is a vertical, longitudinal, sectional view through the air cleaner with the parts assembled.

The invention is illustrated as comprising a cylindrical case 1 in the form of a band, intermediate the ends of which is an elongated, arcuate discharge opening 2. Along the opposite longitudinal edges of the discharge opening are perforate partitions 3 and 4, which are co-extensive with the cross section of the casing 1. The partitions 3 and 4 may consist of perforate disks and they are held in grooves 5 and 6 respectively, formed by crimping the casing.

At the respective ends of the band are perforate end walls 7 and 8, which co-operate with the partitions 5 and 6 to divide the casing into two filter chambers 9 and 10, in which are located filter beds 11 and 12. The filter beds 11 and 12 preferably consist of blocks of sponge rubber, the normal diameters of which are slightly greater than the diameter of the band 1 so that the disks 11 and 12 can be sprung into the band so they will be outwardly bowed or formed into concavo-convex filter beds with the convex portions near the ends of the band. The walls 7 and 8 are held in place by split rings 13 and 14 held in the beaded portions 15 and 16 at the end of the band 1.

The spaced partitions 3 and 4 form a central clean air space 17 in the casing which discharges through the elongated arcuate orifice 2. The curve of the outlet orifice 2 is concentric with the band 1 and the tubular port 18 surrounding the orifice 2 extends about the periphery of the band 1 to make a relatively large port area so that the air can freely pass from the central chamber 17 into the tube 19 and then into the carburetor 20, connected to the manifold 21 of the engine 22 in the usual way.

The end walls 7 and 8 are concavo-convex, the concave portions of the end walls conforming to the convex ends of the filter beds.

When the parts are assembled and the intake stroke of the engine causes a suction through the pipe 19, the air will be drawn through the filter beds where the dust and dirt will be filtered therefrom. The filter beds will have a slight vibratory motion, due to the flexibility of the material and due to the inherent resiliency of the material, the band will spring back against the end walls 7 and 8 in intermittent recurrence so that the dust which accumulates on the outside of the beds will be jarred loose, tending to keep the filter beds clean or free of accumulated dust. Equal quantities of air may be drawn through the respective ends of the casing, the capacity of the central chamber 7 being great enough to accommodate the incoming air to allow it to flow freely through the arcuate outlet port 2 into the piping 19.

There is a material advantage in having the casing open at its respective ends because a maximum amount of air can be passed through it, or double the quantity that could be passed through it if only one end were open. This enables me to construct the entire device so that it will occupy a minimum space and I thereby avoid the necessity for making the air cleaner so large as to be unsightly and cumbersome.

It will be apparent that the parts of the device can be easily assembled; the casing and port 18 may be constructed by securing the port 18 to the band, then the walls 3 and 4 can be sprung into the grooves 5 and 6; the filter beds may be then introduced and, finally, the end walls can be secured in place by the split rings 13 and 14, which may be sprung into the beaded portions 15 and 16.

It will, therefore, be seen that the device is simple, that it will be inexpensive to manufacture, and that it will remove the solids from the air before the air enters the pipe 19 preparatory to passing into the carburetor 20.

What I claim and desire to secure by Letters Patent is:

1. An air cleaner for hydrocarbon engines comprising a casing consisting of a band having open ends, spaced concavo-convex, end walls in the band to complete the casing, the convex portions of the end walls being disposed outwardly, spaced open partitions in the casing between the end walls, the partitions and the end walls providing filter bed spaces of varying cross section, the greatest cross section being in the center, the partitions being spaced apart to provide a central clean air chamber discharging through an outlet through the wall of the band and vibrating filter beds in the spaces between the partitions and the end walls so that air drawn through the end walls into the central chamber will pass through the filter beds; the filter beds, consisting of flexible material of concavo-convex form, the convex sides of the filter beds being toward the concave faces of the end walls, so that the convex sides of the filter beds normally lie against the concave faces of the end walls.

2. An air cleaner for hydrocarbon engines comprising a casing consisting of a band having open ends, spaced walls in the ends of the band to complete the casing, spaced open partitions in the casing between the end walls, the partitions being in spaced relation to provide a central clean air chamber discharging through an outlet in the side of the band, and filter beds in the spaces between the partitions and the end walls so that air drawn through the end walls into the central chamber will pass through the filter beds, the outlet for the clean air chamber being arc-shaped, the curved dimension being greater than the cross dimension to provide a relatively large opening for the exhaust of the air from the central chamber.

In testimony whereof I affix my signature.

JOHN A. GORDON.